(12) United States Patent
Pillonnet et al.

(10) Patent No.: US 12,506,408 B2
(45) Date of Patent: Dec. 23, 2025

(54) CONVERTING AN INPUT DC VOLTAGE INTO AN OUTPUT DC VOLTAGE HAVING A PREDETERMINED VALUE USING BATTERIES

(71) Applicants: COMMISSARIAT A L'ENERGIE ATOMIQUE ET AUX ENERGIES ALTERNATIVES, Paris (FR); INSTITUT NATIONAL DES SCIENCES APPLIQUEES DE LYON, Villeurbanne (FR); Centre national de la recherche scientifique, Paris (FR); UNIVERSITE CLAUDE BERNARD LYON I, Villeurbanne (FR); ECOLE CENTRALE DE LYON, Ecully (FR)

(72) Inventors: Gaël Pillonnet, Grenoble (FR); Bruno Allard, Villeurbanne (FR); Carlos-Augusto Berlitz, Grenoble (FR); Sami Oukassi, Grenoble (FR)

(73) Assignees: COMMISSARIAT A L'ENERGIE ATOMIQUE ET AUX ENERGIES ALTERNATIVES, Paris (FR); INSTITUT NATIONAL DES SCIENCES APPLIQUEES DE LYON, Villeurbanne (FR); CENTRE NATIONAL DE LA RECHERCHE SCIENTIFIQUE, Paris (FR); UNIVERSITE CLAUDE BERNARD LYON I, Villeurbanne (FR); ECOLE CENTRALE DE LYON, Ecully (FR)

(\*) Notice: Subject to any disclaimer, the term of this patent is extended or adjusted under 35 U.S.C. 154(b) by 944 days.

(21) Appl. No.: 17/704,596

(22) Filed: Mar. 25, 2022

(65) Prior Publication Data
US 2022/0329157 A1 Oct. 13, 2022

(30) Foreign Application Priority Data

Apr. 9, 2021 (FR) .................................... 2103649

(51) Int. Cl.
*H02M 3/158* (2006.01)
*H01M 10/0585* (2010.01)
(Continued)

(52) U.S. Cl.
CPC ....... *H02M 3/158* (2013.01); *H01M 10/0585* (2013.01); *H01M 10/4207* (2013.01);
(Continued)

(58) Field of Classification Search
CPC .................................................. H02J 7/00712
(Continued)

(56) References Cited

U.S. PATENT DOCUMENTS 8,610,404 B2   12/2013   Reefman et al.
2008/0054327 A1  3/2008  Johnson
(Continued)

FOREIGN PATENT DOCUMENTS

WO   2007/141722 A1   12/2007

OTHER PUBLICATIONS

Peng et al., "A Magnetic-less DC-DC Converter for Dual Voltage Automotive Systems", IEEE Transactions on Industry Applications, vol. 39, Issue: 2, 2003.
(Continued)

*Primary Examiner* — Yalkew Fantu
(74) *Attorney, Agent, or Firm* — BakerHostetler

(57) ABSTRACT

A device for converting an input DC voltage into an output DC voltage having a predetermined value, includes a set of elementary components comprising: an input voltage source; two output nodes; and a plurality of energy-storing elements, each consisting of one battery or of a plurality of
(Continued)

batteries connected in series or in parallel. The converting device further comprises a switching matrix, configured to connect the elementary components to one another in a periodic cycle composed of a plurality of phases so that, for each cycle: Each phase is associated with one different connection configuration chosen so that, in each energy-storing element, the amount of charge at the start of the cycle is equal to the amount of charge at the end of the cycle.

12 Claims, 8 Drawing Sheets

(51) Int. Cl.
*H01M 10/42* (2006.01)
*H02J 7/00* (2006.01)

(52) U.S. Cl.
CPC ........ *H02J 7/0013* (2013.01); *H02J 7/00712* (2020.01); *H02J 2207/20* (2020.01)

(58) Field of Classification Search
USPC .......................................................... 320/116
See application file for complete search history.

(56) References Cited

U.S. PATENT DOCUMENTS

| | | | |
|---|---|---|---|
| 2010/0253154 A1 | 10/2010 | Yeates | |
| 2016/0352219 A1* | 12/2016 | Amgad Abdulslam | ..................... H02M 1/08 |
| 2019/0312511 A1* | 10/2019 | Crossley | ................. H02M 1/14 |
| 2020/0295660 A1* | 9/2020 | Oguma | ................... H02J 7/342 |

OTHER PUBLICATIONS

Muhammad, et al., "Reconfigurable Battery Systems: A Survey on Hardware Architecture and Research Challenges". ACM Transactions on Design Automation of Electronic Systems, vol. 24, No. 2, Article 19, Mar. 2019.

* cited by examiner

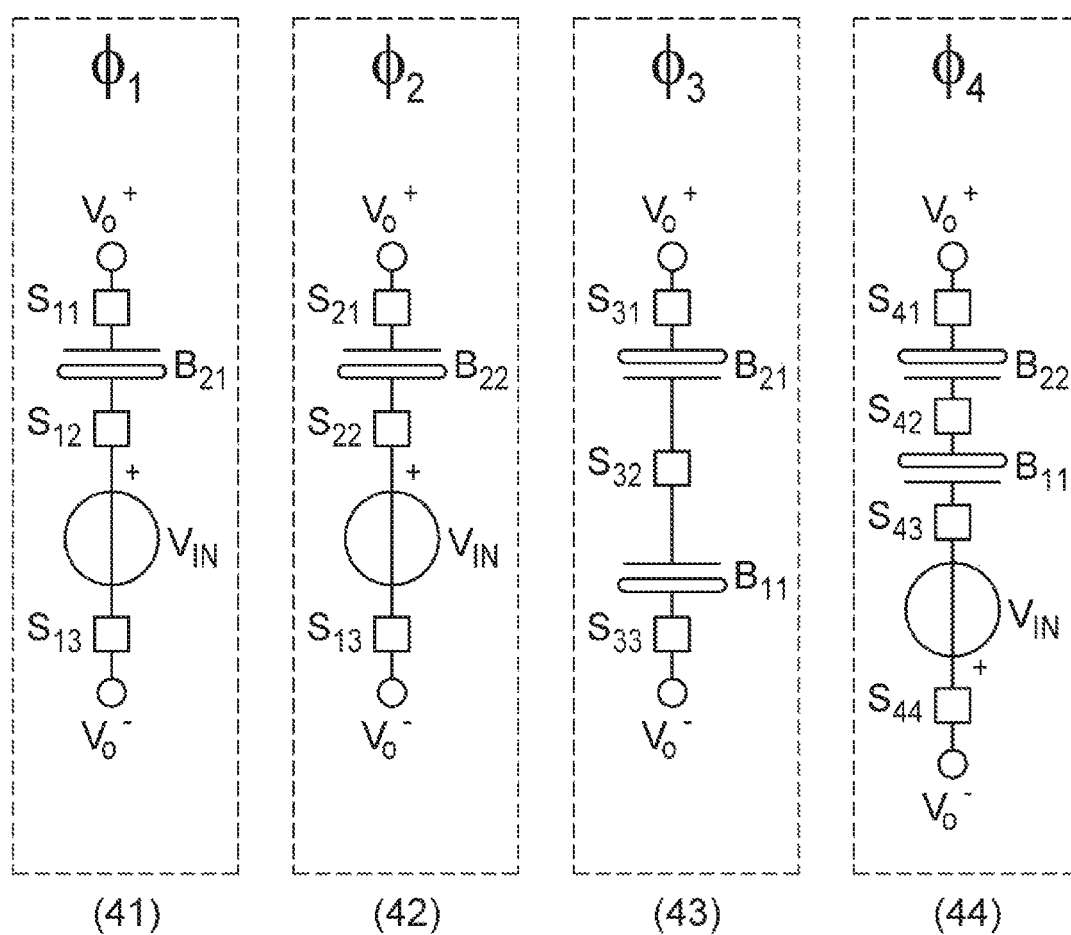

$V_1 = 2.5, V_2 = 3$
4 phases
2 batteries in two series $$M2 \begin{bmatrix} 1 & 0 & -1 \\ 0 & -2 & 2 \\ 1 & 0 & -1 \\ -1 & 2 & 0 \end{bmatrix}$$

$V_1 = 3, V_2 = 3.5$
4 phases
4 batteries in the 1st series
2 batteries in the 2nd series $$M3 \begin{bmatrix} 1 & -1 & 0 \\ -1 & 4 & -2 \\ 0 & -2 & 2 \\ 1 & -1 & 0 \end{bmatrix}$$

$V_1 = 3, V_2 = 3.25$
4 phases
6 batteries in the 1st series
4 batteries in the 2nd series $$M4 \begin{bmatrix} 1 & -1 & 0 \\ -1 & 6 & -4 \\ 0 & -4 & 4 \\ 1 & -1 & 0 \end{bmatrix}$$

$V_1 = 2.3, V_2 = 3.4$
8 phases
20 batteries in the 1st series
15 batteries in the 2nd series $$M5 \begin{bmatrix} 1 & 12 & -9 \\ 0 & -4 & 3 \\ 0 & -4 & 3 \\ -1 & -20 & 15 \\ 1 & 12 & -9 \\ 1 & 12 & -9 \\ 0 & -4 & 3 \\ 0 & -4 & 3 \end{bmatrix} \text{ or}^* \quad M5' \begin{bmatrix} 1 & -9 & 12 \\ 0 & 3 & -4 \\ 0 & 3 & -4 \\ -1 & 15 & -20 \\ 1 & -9 & 12 \\ 1 & -9 & 12 \\ -1 & 15 & -20 \\ 1 & -9 & 12 \end{bmatrix}$$

$V_1 = 2.6, V_2 = 3.8$
12 phases
15 batteries in the 1st series
20 batteries in the 2nd series $$M6 \begin{bmatrix} 1 & 4 & -7 \\ 0 & -10 & 15 \\ 1 & 4 & -7 \\ 1 & 4 & -7 \\ 0 & -10 & 15 \\ -1 & 15 & -20 \\ 0 & -10 & 15 \\ 1 & 4 & -7 \\ -1 & 15 & -20 \\ 0 & -10 & 15 \\ 1 & 4 & -7 \end{bmatrix} \text{ or more simply}^* \quad M6' \begin{bmatrix} 1 & -7 & 4 \\ 0 & 15 & -10 \\ 1 & -7 & 4 \\ -1 & -1 & 2 \end{bmatrix}$$

Fig. 5

CONVERTING AN INPUT DC VOLTAGE INTO AN OUTPUT DC VOLTAGE HAVING A PREDETERMINED VALUE USING BATTERIES

CROSS-REFERENCE TO RELATED APPLICATION

This application claims priority to foreign French patent application No. FR 2103649, filed on Apr. 9, 2021, the disclosure of which is incorporated by reference in its entirety.

FIELD OF APPLICATION

The present invention relates to the field of DC-DC voltage converters based on batteries and more particularly batteries of rechargeable solid-state accumulators integratable into an integrated circuit on a semiconductor substrate. More specifically, the operation of DC-voltage converters according to the invention is based on an arrangement of phases during which one or more batteries are connected in series, in order to form a cycle meeting a number of criteria.

BACKGROUND

The conversion of an input DC voltage $V_{in}$ into a different output DC voltage $V_{out}$ is a basic function in electronics. If the conversion ratio $V_{out}/V_{in}$ is higher than 1, reference is made to an up converter. If the conversion ratio $V_{out}/V_{in}$ is lower than 1, reference is made to a down converter. When the input voltage and the output voltage are significantly different, this conversion is achieved using what are referred to as switched-mode converters.

A switched-mode converter incorporates at least one intermediate energy-storing element such as an inductor or a capacitor. The energy-storing element is connected, in N possible connection configurations, to the input and output via a switching cell during a predefined cycle. Each energy-storing element has two terminals, one positive and one negative.

By "phase" what is meant is a time period corresponding to one connection configuration, chosen from the possible configurations. During each phase, depending on the activation of each of the switching cells, some of the energy-storing elements and optionally the generator of the input voltage are connected in series. By "cycle" what is meant is a sequence in which phases are periodically placed one after the other in a repetitive and predefined manner.

The invention intends to solve a technical problem in this field, namely that of designing DC-voltage converters based on solid-state batteries such as to achieve better integratability of the converting device. The operation of the voltage converter according to the invention is organized into cycles having specific characteristics that allow the robustness of the converter to be increased and its energy efficiency to be improved.

Specifically, in a switched-mode converter, a switching cell is associated with each energy-storing element with a view to connecting the two terminals of said element in the configuration of the phase in progress. A control circuit commands the switching cells in order to guarantee the right ratio between the input voltage and the output voltage. Various parameters, such as the working frequency of the converter, the duration of the various phases, and the conductivity of the switches, allow the control law of the system to be defined. Defining the cycles and phases in combination with these various technological parameters makes it possible to guarantee a high energy efficiency, with a ratio between the input power and the output power $P_{OUT}/P_{IN}$ close to unity.

The area and the volume of the converter often depend on the size of the energy-storing elements. The ratio between the volume of one of the energy-storing elements and its energy-storing density is more critical in low-power converters. It is therefore crucial to choose the components forming the energy-storing elements depending on the specifications of the converter. Switched-mode converters may be divided into two large families: inductive converters and capacitive converters. The energy-storage density of the storing elements is determined by the type of components chosen and their parameters. In the case of capacitive converters, the energy is stored and exchanged in the form of electrostatic charge; in the case of inductive converters the energy is stored and exchanged in the form of magnetic flux.

Inductive converters are based on energy-storing elements produced using inductive components. The drawback of inductors is how difficult they are to integrate into microelectronic integrated circuits and into the systems-on-chip comprising the switching cells and the circuits for controlling the operation of the converter. In addition, the miniaturization of integrated components further accentuates the effect of the reduction in volume of the storing components on their volumetric energy density. It may be surmised therefrom that capacitive DC-DC converters are more suitable for applications of on-board systems since capacitive energy-storing elements are integratable into systems-on-chip. This is advantageous in that all of the components of the converter are integratable into a single integrated circuit allowing the area and volume of the device to be decreased and the cost of integration and of manufacture of the DC-voltage converting device to be limited. In addition, the emergence of bulk capacitive elements has reinforced the preference for capacitive energy-storing elements with respect to inductive elements when producing integrated converters.

However, the volumetric energy density of capacitive elements remains limited, especially because charge is stored on the surface of electrodes placed facing. The storage is said to be "surface" storage. Bulk effects have been demonstrated, but still remain unsatisfactory.

In order to increase the volumetric energy density of storing elements (and therefore to decrease the size of the converter), rechargeable batteries are one potential solution that could be used to replace electrostatic capacitive elements in converters. Generally, the bulk electro-chemical reactions, in the electrolyte between the two electrodes, ensure that batteries have volumetric energy densities that are very much higher than those of electrostatic capacitive elements. However, batteries are difficult to integrate and often lose their energy-density advantages when miniaturized with a view to integrating them into chips.

Solid-state batteries (or microbatteries) are a new battery technology in development. This technology is compatible with a microelectronic fabrication process. This type of microbattery has physical, density, thickness and unit-size characteristics allowing a compromise to be obtained between miniaturization and energy efficiency.

The technical problem with the use of microbatteries is that they exhibit the desired performance only when they are subjected to operating voltages belonging to a narrow range of bias voltages with an amplitude of variation comprised between 100 mV and 300 mV. It is thus sought to minimize the variations in the voltage across the terminals of the microbatteries of the voltage converter so that the bias voltage of each microbattery remains around the optimal operating point in terms of energy density.

United States patent application U.S. Pat. No. 8,610, 404B2 proposes to use, around a microbattery, a switching stage to convert an input DC voltage into an output DC voltage. The drawback of the solution proposed by the aforementioned US patent is that the optimal bias voltage of the microbatteries at which the energy density is maximum is chosen to be approximately equal to the output voltage. Thus, the set of microbatteries compatible with the converter according to U.S. Pat. No. 8,610,404B2 is constrained by the value of the output voltage, this limiting options when designing the DC-DC converter. In addition, in the converter proposed by the prior-art solution, charge balance is not achieved at the end of each cycle and the patent proposes a scheme to rebalance charge periodically, this adding complexity to the proposed solution.

The publication by F. Z. Peng et al. titled "A Magneticless DC-DC Converter for Dual Voltage Automotive Systems" describes a situation in which two batteries are connected by a switching cell. The two batteries are almost always used to store energy. If one of the batteries is depleted or if it is no longer able to deliver the required current, the circuit connects the batteries to each other. The drawback of the solution proposed by this publication is the absence of charge balance at the end of each cycle. In addition, the solution of F. Z. Peng et al. does not propose arranging the series-connected batteries in a particular way to adapt to the input and output voltages of the converter.

The publication "Reconfigurable Battery Systems: A Survey on Hardware Architecture and Research Challenges" by S. Muhammad, et al. describes a reconfigurable battery-connection topology managed by a switching system and a control unit. The operating mode of the control of this switching cell is governed by various rules that do not address the notion of exchanging small amounts of charge continuously between the various energy-storing elements.

To mitigate the limitations of the existing solutions as regards the decreases in the area of switched-mode DC-voltage converters integrated into a system-on-chip, the increase in the volumetric energy density and the technical robustness of the device, the invention proposes to organize the operation of a DC-voltage converter produced with a plurality of solid-state microbatteries according to a particular cycle having the following characteristics:

A controlled bias: the bias voltage across the terminals of each microbattery is kept around an operating point corresponding to a voltage plateau during the variation in the amount of charge exchanged in the energy-storing element throughout the cycle.

A closed cycle: the amount of charge stored in each energy-storing element at the start of a cycle is equal to the amount of charge at the end of the cycle.

In the energy-storing element, the amount of charge exchanged from one phase to the next is very much smaller than the overall amount of charge present in the energy-storing element.

The nodes on which the output voltage is measured are always connected to at least one energy-storing element in each phase of the cycle.

The controlled bias allows the battery to be used at the optimal operating point in terms of energy density. The charge balance of the closed cycle allows stable operation to be obtained avoiding the need for additional recharging and discharging phases that would affect the overall efficiency of the converter and its reliability. The small relative variation in the amount of charge in the storing element during the exchanges during the operating cycle allows the voltage variation across the terminals of the batteries to be minimized and therefore charge-sharing losses to be minimized. This allows the energy efficiency of the switched-mode voltage converter to be increased. The small relative variation in the amount of charge in the storing element further allows the duration of the cycles to be increased because the depth of discharge in the storing elements is small, this limiting depletion of the storing element. The permanent connection of the nodes of the output voltage to at least one energy-storing element allows the designer to simplify the converter because the decoupling capacitor that is usually connected to the output in prior-art solutions is not required.

SUMMARY OF THE INVENTION

The subject of the invention is a device for converting an input DC voltage into an output DC voltage having a predetermined value, comprising:
  a set of elementary components comprising:
    a voltage source for generating the input DC voltage;
    two output nodes;
    a plurality of energy-storing elements, each consisting of one battery or of
    a plurality of batteries connected in series or in parallel;
  a switching matrix, configured to connect the elementary components to one another in a periodic cycle composed of a plurality of phases, so that, for each cycle:
  each phase is associated with one different connection configuration chosen so that:
  in each energy-storage element, the amount of charge at the start of the cycle is equal to the amount of charge at the end of the cycle;
  the two output nodes have a potential difference equal to the predetermined value of the output DC voltage during all the phases.

According to one particular aspect of the invention, the voltage across the terminals of each energy-storing element is kept in a predetermined voltage range corresponding to a voltage plateau during the variation in the amount of charge in the energy-storing element.

According to one particular aspect of the invention, the duration of each phase is defined so that the relative variation in the amount of charge in the energy-storing element from one phase to the next is lower than a predetermined value.

According to one particular aspect of the invention, the output nodes are always connected to at least one energy-storing element in each phase.

According to one particular aspect of the invention, the switching matrix is configured so that, for each cycle:
  for each chosen configuration, a number of elementary components are connected in series with one another;
  and the output voltage is equal to the sum of the voltages across the terminals of the series-connected elementary components.

According to one particular aspect of the invention, the switching matrix comprises a plurality of elementary switching cells, each elementary switching cell being associated with one elementary component and comprising at least two commanded switches. Each elementary component has two terminals, and for each elementary component:
  the first terminal is connected, via at least a first commanded switch, to any at least one terminal chosen from the terminals of the other elementary components or either one of the output nodes;

the second terminal is connected, via at least a second commanded switch, to any at least one terminal chosen from the terminals of the other elementary components or either one of the output nodes.

According to one particular aspect of the invention, the commanded switches are produced with CMOS transistors.

According to one particular aspect of the invention, the batteries are solid-state batteries.

According to one particular aspect of the invention, the solid-state batteries are produced by stacking layers and comprise:
a positive electrode;
a negative electrode;
an inorganic solid electrolyte layer placed between the positive electrode and the negative electrode.

According to one particular aspect of the invention, the solid-state batteries are lithium-ion microbatteries.

According to one particular aspect of the invention, the variation in the voltage across the terminals of each energy-storing element is smaller than 10 mV.

According to one particular aspect of the invention, the cycles have a frequency comprised between 1 Hz and 10 kHz.

According to one particular aspect of the invention, the converting device further comprises a circuit for controlling bias configured to reset the voltage across the terminals of each energy-storing element to a value corresponding to an optimum energy density after a predetermined number of cycles.

BRIEF DESCRIPTION OF THE DRAWINGS

Other features and advantages of the present invention will become more clearly apparent upon reading the following description with reference to the following appended drawings.

FIG. 3a illustrates the various phases of one example of implementation of a switched-mode converter according to the invention.

FIG. 3b illustrates the switching cells used with the example of FIG. 3a.

FIG. 5 illustrates a plurality of examples of converter command matrices according to the invention achievable with microbatteries integratable into integrated circuits.

DETAILED DESCRIPTION

Figure 1A:
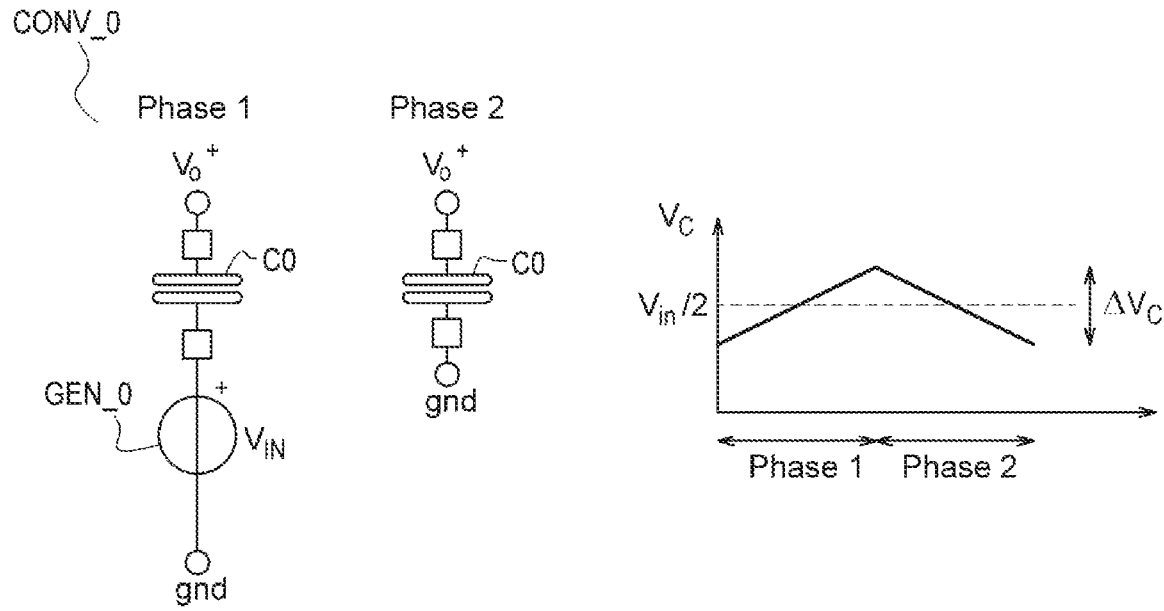
FIG. 1a illustrates a circuit diagram and the operation of one example of a DC-voltage switched-mode converter based on a capacitive storing element according to the prior art.

FIG. 1a illustrates a circuit diagram and the operation of one example of a DC-voltage switched-mode converter CONV_0 based on a capacitive storing element CAP_0 according to the prior art.

The switched-mode converter CONV_0 comprises a voltage source GEN_0 that delivers the DC input voltage $V_{in}$, two output nodes $V_o^+$ and $V_o^-$ between which the output voltage $V_{out}=V_o^+-V_o^-$ is measured and a capacitive element C0 for storing energy in the form of electrostatic charge. The switched-mode converter CONV_0 functions in a periodic cycle composed of two phases: phase 1 and phase 2. Each phase corresponds to one chosen configuration of connection between the various components of the converter CONV_0. Generally $V_o^-$ is connected to the electrical ground playing the role of electrical reference.

During phase 1, the capacitive element C0 is connected in series with the voltage source GEN_0, and the negative terminal of the voltage source GEN_0 is connected to the electrical ground. The output voltage is thus measured across the terminals of the series of the voltage source GEN_0 and of the capacitive element C0. Initially, the capacitive element is charged to obtain a biasing point equal to half the input voltage $V_{in}$. During phase 1, the capacitor C0 will receive an amount of charge (charge) delivered by the input voltage source GEN_0, whence the increasing variation in the voltage across the terminals of the capacitive element during phase 1. The voltage across the terminals of the capacitive element C0 varies from a value slightly lower than $V_{in}/2$ to a slightly higher value.

During phase 2, the capacitive element C0 is disconnected from the input voltage source. The output voltage is measured across the terminals of the capacitive element C0. The capacitor C0, since it is connected to the electrical ground, will deliver an amount of charge (discharge), whence the decreasing variation in the voltage across the terminals of the capacitive element during phase 2. The voltage across the terminals of the capacitive element C0 varies from a value slightly higher than $V_{in}/2$ to a slightly lower value.

We have described a cycle of two phases that repeat identically so as to achieve an average voltage across the terminals of the capacitive element C0 equal to $V_{in}/2$. The various configurations of connection between C0 and GEN_0 corresponding to each of the phases are achieved with commanded switches that have not been shown in FIG. 1a.

It may be surmised from above that the capacitive elements in a switched-mode DC-voltage converter see periodic variations in voltage across their terminals during the operating cycles of the converter. The amplitude of these variations is denoted $\Delta V_c$.

Figure 1B:
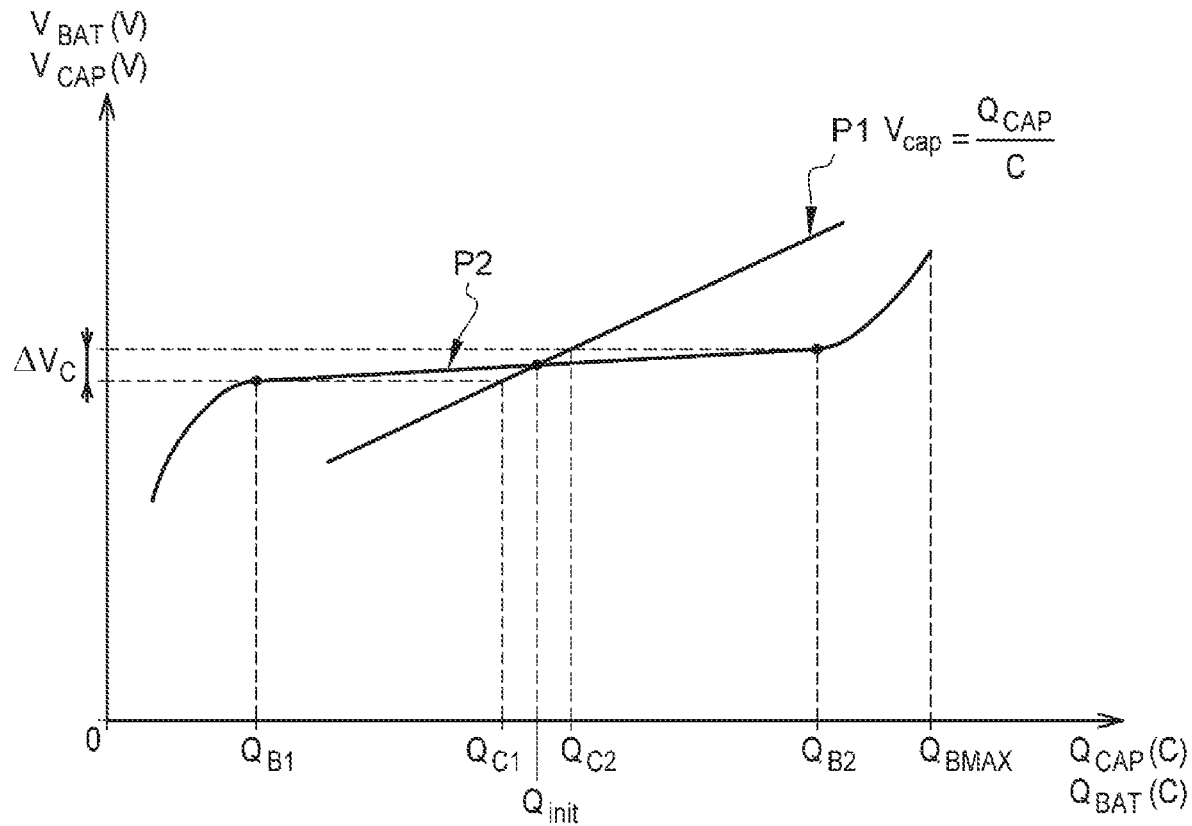
FIG. 1b illustrates a first curve P1 characteristic of the variation in the voltage across the terminals of a capacitor as a function of the amount of charge stored and a second curve P2 characteristic of the variation in the voltage across the terminals of a battery as a function of the amount of charge stored.

FIG. 1b illustrates a first curve P1 characteristic of the variation in the voltage $V_{CAP}$ across the terminals of a capacitor as a function of the amount of charge stored $Q_{CAP}$. FIG. 1b further illustrates a second curve P2 characteristic of the variation in the voltage $V_{BAT}$ across the terminals of a battery as a function of the amount of charge stored $Q_{BAT}$.

Both types of capacitive elements (capacitor and battery) are initially charged to an initial value $Q_{init}$ thus setting the bias voltage of said element. In a capacitor, the voltage across its terminals is proportional to the charge stored on the positive terminal of the capacitor. Discharging the capacitor induces a decrease in the amount of charge, this causing a decrease in the voltage $V_{CAP}$ across the terminals of the capacitor. The slope of the variation in the voltage $V_{CAP}$ as a function of the charge stored $Q_{CAP}$ is equal to the inverse of the capacitance of the capacitor. When the capacitor exchanges charge with the other elements of the converter, the value of the charge stored $Q_{CAP}$ varies and the voltage $V_{CAP}$ varies in turn about the operating point with an amplitude of variation $\Delta V_c$.

In batteries, the relationship between the voltage across the terminals of the battery $V_{BAT}$ and the amount of charge stored $Q_{BAT}$ in the battery is not a linear relationship. The curve P2 has three regions of operation:
- a first region with a high increasing slope when the amount of charge $Q_{BAT}$ is between 0 and a limit value $Q_{B1}$.
- a second region in which the voltage plateaus, in a range of variation in the charge bounded by two limit values $Q_{B1}$ and $Q_{B2}$.
- a third region with a high increasing slope when the amount of charge $Q_{BAT}$ is between the limit value $Q_{B2}$ and the maximum charge value $Q_{BMAX}$.

From a practical point of view, there is no appreciable direct correlation between the voltage $V_{BAT}$ across the terminals of a battery and the amount of charge $Q_{BAT}$. Specifically, in the plateau second region, the charge/discharge of the battery with respect to voltage has a very low slope meaning a small variation $\Delta V_c$ in voltage for a large range of variation in charge bounded by the two limit values $Q_{B1}$ and $Q_{B2}$.

To obtain the same slope with a capacitor, a larger capacitor area would be required larger than that of a battery by 1000 to 10000 times. The low slope allows the amplitude of the variation $\Delta V_c$ in the voltage across the terminals of the capacitive element to be limited. The decrease in $\Delta V_c$ increases the energy efficiency of the entire converter. Whence the advantage of using batteries in the DC-voltage switched-mode converter.

The converter according to the invention aims to exploit this low slope to improve, at equal area, the efficiency of the DC-DC converter by replacing the floating capacitors integrated into the converter with batteries, and by using a particular cycle. Positioning the operating point in the region of low slope further allows switching frequency to be decreased and therefore the switching losses and electromagnetic interference induced by a high switching frequency and its harmonics to be decreased.

Generally, the relationship between the slope of the charge/discharge curve and the energy efficiency of a capacitive element is defined by charge sharing loss. Specifically, on connection of a voltage source to a capacitive storing element, the energy efficiency of charging (or discharging) depends on the initial match between the source voltage and the voltage across the terminals of the capacitive element.

In the example of the switched-mode capacitor-based converter of FIG. 1a, the capacitor charges partially in the course of the first phase via the voltage source GEN_0, then partially discharges to the terminals of the output. The amount of charge exchanged $\Delta Q_{CAP}$ is directly proportional to the voltage variation $\Delta V_C$. This voltage variation $\Delta V_C$ induces charge sharing loss due to the parasitic impedances in the connections between the various elementary components that exchange electric charge, thus decreasing the overall energy efficiency of the converter. Specifically, the operations of charging/discharging capacitive element cause currents to be drawn through the switches, these currents having an amplitude proportional to $\Delta V_C$.

It is envisionable to decrease the amplitude of the voltage variations $\Delta V_C$ by increasing capacitor capacitance. This solution has the drawback of considerably increasing the area of the integrated circuit, which becomes incompatible with on-board systems intended to be located in portable devices. It will be recalled that the electrical capacitance of a capacitor is proportional to its area and/or its volume.

It is envisionable to decrease the amplitude of the voltage variations $\Delta V_C$ by increasing the frequency of the cycles (and therefore of the phases). This solution has the drawback of increasing energy losses in the switches switched at very high frequency.

Thus, by comparing the curves P1 and P2, the advantage of replacing capacitors with batteries with regard to producing energy-storing elements in a converter exhibiting low variations in voltage $\Delta V_C$ may be seen. Specifically, if batteries are used instead of capacitors, $\Delta V_C$ will be greatly decreased for the same amount of charge exchanged ($Q_{C1}-Q_{C2}$) at equal area. In other words, at constant $\Delta V_C$ between the two solutions, the amount of charge will be far higher ($Q_{C1}-Q_{C2}$ for the capacitor and $Q_{B1}-Q_{B2}$ for the battery). This allows the capacitive element to thus increase the ability of the converter to deliver greater amounts of charge under the same loss regime.

Alternatively, the position of the biasing point on the voltage plateau may be used to decrease the switching frequency of the converter in order to limit the electromagnetic interference of the converter with other neighboring circuits implemented on the same chip.

However, the bias voltage across the terminals of the battery must be kept in the range corresponding to the second region associated with the plateau in voltage as a function of charge. The value of the voltage is set in the converter by the configurations of connection between the elements of the converter of each phase, the duration of the phases (and therefore the operating frequency) but also the amount of charge stored in each of the batteries of the converter.

Figure 2A:
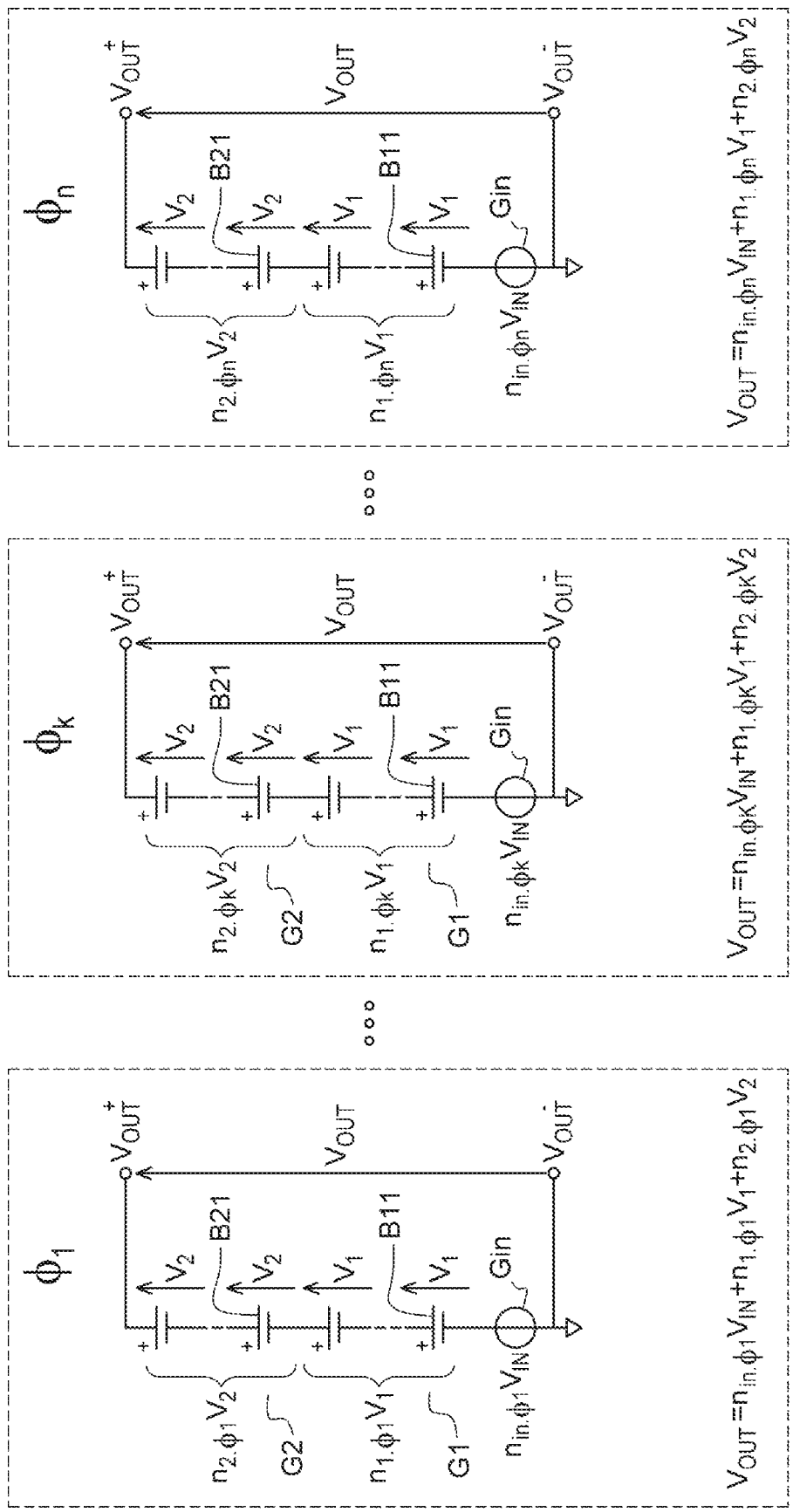
FIG. 2a illustrates the general architecture of a switched-mode converter of a DC voltage according to the invention produced with solid-state batteries.

FIG. 2a illustrates the general architecture of a switched-mode converter of a DC voltage according to the invention produced with solid-state batteries.

Here, the various operating phases of a device for converting an input DC voltage $V_{in}$ into an output DC voltage $V_{out}$ with a predetermined value depending on the chosen conversion ratio has been shown. The converting device comprises a set of elementary components comprising: a voltage source $G_{in}$ for generating the input DC voltage $V_{in}$; two output nodes $V_{out+}$ and $V_{out-}$ across the terminals of which the output DC voltage is measured; and a plurality of energy-storing elements $B_{i,j}$ that correspond to the jth battery of the ith group of batteries. A group of batteries denoted $G_i$ is defined by an optimal bias voltage $V_i$ common to all the batteries of said group; with i and j two strictly positive natural integers.

The converting device further comprises a switching matrix, configured to connect the elementary components to one another in a periodic cycle composed of a plurality of phases. Each phase is associated with one different connection configuration.

During each switching phase, the connection configuration is chosen so that:
- in each energy-storage element, the amount of charge at the start of the cycle is equal to the amount of charge at the end of the cycle;
- the two output nodes $V_{out+}$, $V_{out-}$ have a potential difference that is always equal to the predetermined value of the output DC voltage ($V_{out}$) during all the phases.

It is possible to produce energy-storing elements such that each consists of a single battery or of a plurality of batteries connected in series or in parallel depending on the optimal bias voltage and capacitance desired during the design of the energy-storing element.

The invention proposes a specific arrangement of phases in which some of all of the elementary components (batteries, input voltage source) are connected in series to one another and the output voltage is measured across the terminals of the obtained series of elementary components in each phase. In a general case of the topology allowing these phases to be constructed, the elementary components comprise the source of the input voltage $V_{in}$, and comprise a number $n_S$ of groups $G_i$ (with $n_S \geq 2$). Each group of batteries may contain a different number of batteries, denoted $N_i$. Each group of batteries is defined by the optimal bias voltage $V_i$ common to the $N_i$ batteries that it contains, such that $V_i$ corresponds to the operating plateau region. The batteries may be connected either to the source of the input voltage, or to the output nodes, or to any other terminal of another battery belonging to the same group or to a different group. The jth battery of the ith group of batteries will be denoted $B_{ij}$, the group being defined by a common optimal bias voltage $V_i$. The first objective of the invention is to maintain the following condition: the connection in series of batteries (and optionally of the source of the input voltage $V_{in}$) allows the value of the predefined output voltage in to be achieved in each phase by virtue of a linear combination of series-connected batteries $B_{ij}$.

Control means generate control signals that are intended to manage the operation of the switching matrix and therefore to choose the configuration of connection between the various elementary components in each phase. In each phase, this control makes it possible to obtain an arrangement of series-connected batteries, potentially connected to the input voltage $V_{IN}$, such that the sum of the series-connected voltages of some of the batteries and optionally of the input-voltage source is equal to the targeted value of the output voltage $V_{OUT}$.

The control means are generally programmed beforehand to apply a predetermined control-signal sequence allowing the configurations of connection between the various elementary components required in each phase according to the invention to be obtained.

During any phase $\theta_k$ of order k (with k a natural integer), the following equality is respected: $V_{out} = n_{in,\phi k} V_{in} + n_{1,\phi k} V_1 + n_{2,\phi k} V_2$ with $n_{in,\phi k} = 1/0/-1$, $n_{1,\phi k}$ the number of batteries connected in series during the phase $\theta_k$ belonging to the first group, $V_1$ the optimal bias voltage of the batteries of the first group, $n_{2,\phi k}$ the number of batteries connected in series during the phase $\theta_k$ belonging to the second group, $V_2$ the optimal bias voltage of the batteries of the second group.

For the sake of simplicity, only two groups of batteries have been shown, but it is envisionable to choose a higher number of groups in order to increase options in respect of linear combinations allowing the defined value of the output voltage $V_{OUT}$ to be obtained.

Figure 2B:
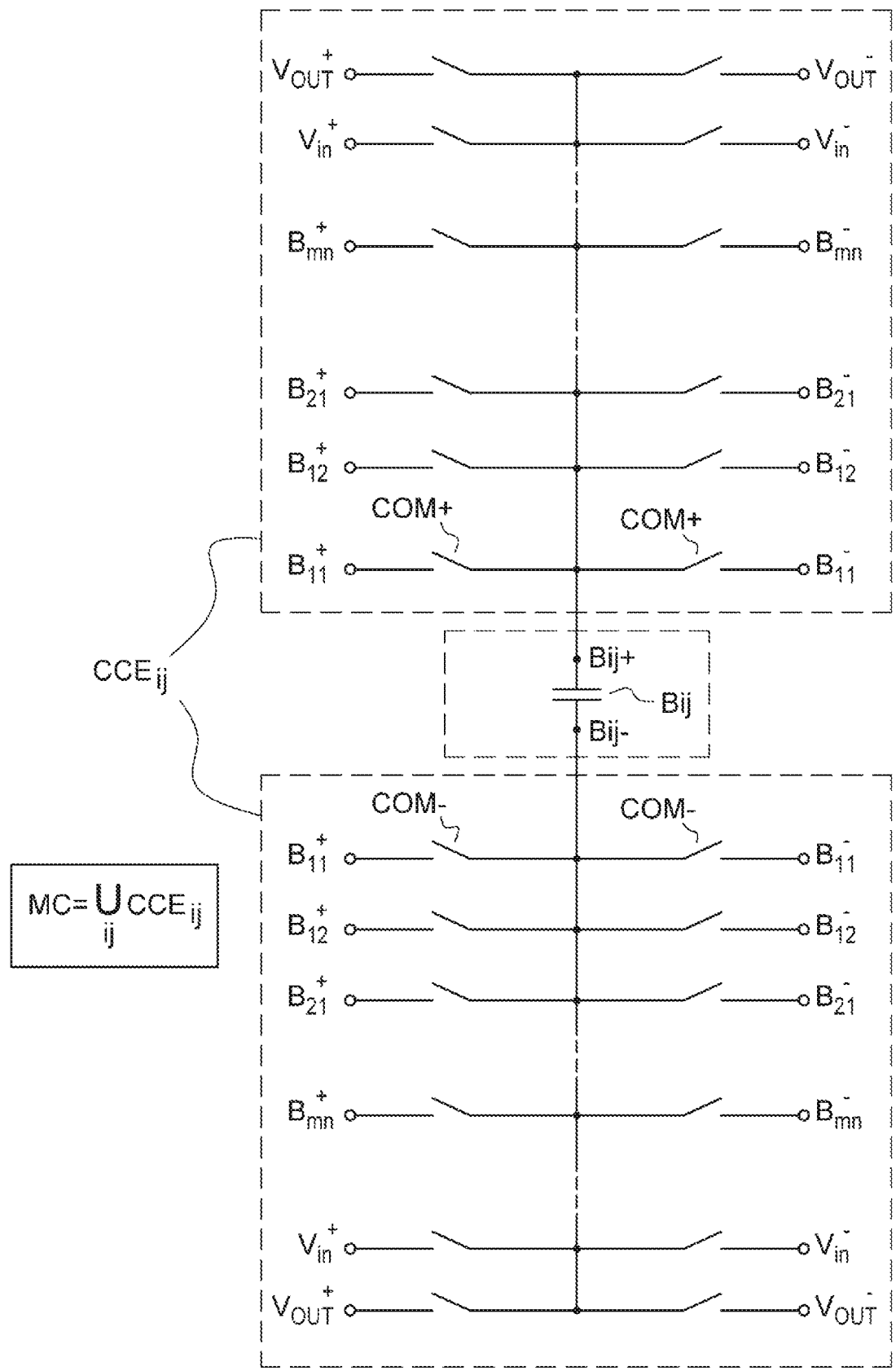
FIG. 2b illustrates the general architecture of a switching cell associated with a battery of the converter according to the invention.

FIG. 2b illustrates the general architecture of a switching cell associated with a battery of the converter according to the invention.

The overall switching matrix MC of the converter comprises a plurality of elementary switching cells $CCE_{ij}$. Each elementary switching cell $CCE_{ij}$ is associated with one elementary component $B_{ij}$ and comprises at least two commanded switches $COM_+$ and $COM_-$. Each elementary component has two terminals, one positive and one negative. For a battery $B_{ij}$, the positive terminal is denoted $B_{ij}^+$ and the negative terminal $B_{ij}^-$. For each elementary component $B_{ij}$ (or the input voltage source GEN):

The first terminal $B_{ij}^+$ is connected, via the at least one first commanded switch $COM^+$, to at least any one terminal, among $B_{mn}^+$, $B_{mn}^-$, $V_{in}^+$ and $V_{in}^-$, chosen from those of the other elementary components or either one of the output nodes $V_{OUT}^+$ and $V_{OUT}^-$.

The second terminal $B_{ij}^+$ is connected, via the at least one first commanded switch $COM^+$, to at least any one terminal, among $B_{mn}^+$, $B_{mn}^-$, $V_{in}^+$ and $V_{in}^-$, chosen from those of the other elementary components or either one of the output nodes $V_{OUT}^+$ and $V_{OUT}^-$.

During a phase, a single switch $COM^+$ is activated for the first terminal $B_{ij}^+$ and a single switch $COM^-$ is activated for the second terminal $B_{ij}^-$ to ensure a solely series connection between the various elementary components as described above.

Generally, the operation of the elementary switching cells $CCE_{ij}$ is organized to obtain switching cycles having the following characteristics:

a. A controlled bias: the bias voltage across the terminals of each micro-battery is kept around an operating point corresponding to a voltage plateau during the variation in the amount of charge in the energy-storing element throughout the cycle.

b. A closed cycle: the amount of charge in each energy-storing element at the start of a cycle is equal to the amount of charge at the end of the cycle.

c. In the energy-storing element, the amount of charge exchanged from one phase to the next is very much smaller than the overall amount of charge present in the energy-storing element.

Characteristic (a) makes it possible to make the batteries work in the operating region corresponding to a voltage plateau so as to minimize the variation in voltage across the terminals of the batteries while remaining in the optimal zone. As demonstrated above, this allows the energy efficiency of the converter to be maximized while keeping the voltage variations $\Delta V_C$ small and while increasing the amount of charge "exchangeable" ($Q_{B1}-Q_{B2}$). This control of the biasing point results directly from the specific arrangement during each phase of the cycle allowing the desired output voltage value to be obtained. Generally, the voltage of each of the batteries is initialized before employment of the converter at a stored charge level corresponding to the plateau such that Q is centered between $Q_{B1}$ and $Q_{B2}$. The combination of characteristics b) and c) then makes it possible to ensure that each battery $B_{ij}$ always remains in the same operating region since the state of charge of each battery is the same at the start and at the end of each cycle and since the amount of charge exchanged with respect to the state of charge of each battery remains relatively low (<1%).

The charge balance (b) for its part allows stable operation to be obtained avoiding the need for additional recharging/discharging phases that would affect the overall efficiency of the converter and its reliability.

The small relative variation in the amount of charge stored (c) during a phase allows the variation in voltage across the terminals of the batteries to be minimized and therefore charge-sharing losses to be minimized and therefore the efficiency of the converter to be increased. This also allows the efficiency of the electrochemical lithiation and delithiation reactions in each battery to be improved.

In one preferred embodiment, the cycles and the phases are chosen so that the nodes on which the output voltage is measured are always connected to at least one energy-storing element in each phase of the cycle. This permanent connection throughout the cycle makes it possible to do without a decoupling capacitor, such a capacitor generally being connected to the output. This is advantageous as it allows the area of the circuit of the converting device to be decreased.

Figure 3B:
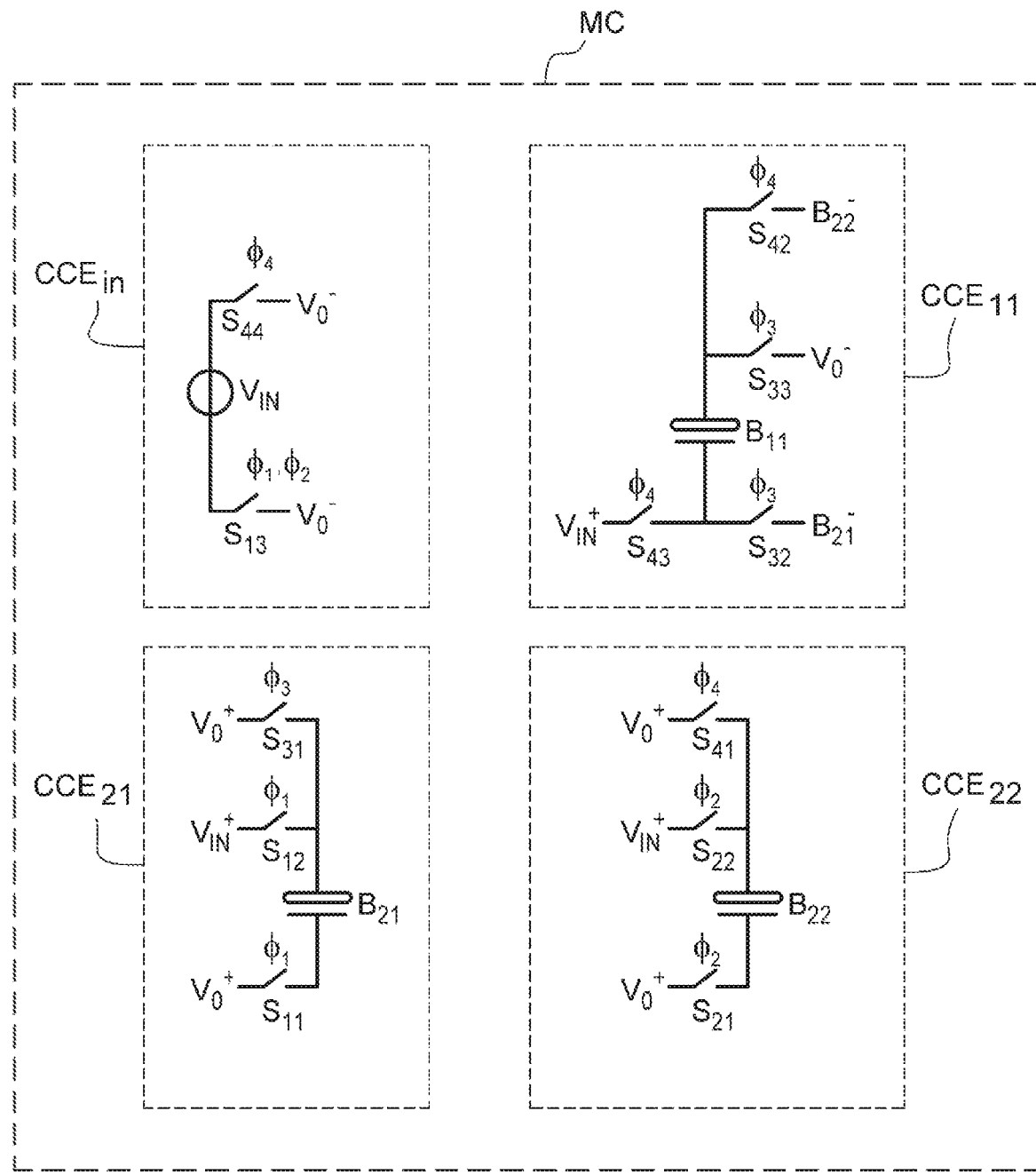

FIG. 3a illustrates the various phases of one example of implementation of a switched-mode converter according to the invention. FIG. 3b illustrates the switching cells used with the example of FIG. 3a.

It is a question of one non-limiting example of embodiment that is given by way of illustration. The converter is produced with two groups of batteries under respective biases of $V_1=2$ V, $V_2=3$ V in order to generate an output voltage $V_{OUT}=1$ V from an input voltage of $V_{IN}=4$ V. It is thus a question of a DC voltage converter with a voltage-conversion ratio equal to ¼. Two groups of batteries are used: a first group $G_1(V_1)=\{B_{11}\}$ composed of a single battery $B_{11}$ under an optimal bias voltage $V_1=2$ V and a second group $G_2(V_2)=\{B_{21}, B_{22}\}$ composed of two batteries $B_{21}$, $B_{22}$, each under an optimal bias voltage of $V_2=3$ V.

All the batteries are initially charged so they are biased at the associated optimal bias voltage. Thus, in the initial state, each battery $B_{ij}$ stores the amount of charge $Q_{ij,opt}$ centered between the values $Q_{B1}$ and $Q_{B2}$ extracted from the characteristic charging/discharging curve of said battery. Assuming an equal phase duration throughout the cycle, and for a current of given amplitude, the choice of a sufficiently short phase duration makes it possible to obtain an amount of charge q delivered per battery very much smaller than the charge $Q_{ij,opt}$ stored in each battery $B_{ij}$ under their biasing points $V_1$ and $V_2$. This amounts to increasing the frequency of the phases from which the cycle is composed, but this frequency increase is limited by the technology of the batteries in which the charge carriers are ions and not electrons. It will be recalled that ions have a mobility lower than that of electrons. Thus, the frequency is limited by the response time of the batteries, which is set by the mobility of the ions. The frequency of the phases with the converter according to the invention is comprised between 1 Hz and 10 kHz.

The cycle of this example of a converter according to the invention is composed of a sequence of 4 phases $\phi_1$ $\phi_2$ $\phi_3$ and $\phi_4$. The control means manage the operation of the converter via the control matrix M1, which is composed, as regards each row, by the control vector $[n_{in}\ n_{11}\ n_{21}\ n_{22}]$ with $n_{in}$ the coefficient associated with the input voltage source $V_{in}$, $n_{11}$ the coefficient associated with the battery $B_{11}$, $n_{21}$ the coefficient associated with the battery $B_{21}$, and $n_{22}$ the coefficient associated with the battery $B_{22}$. In each phase, each component of the control vector may take one among the following values $\{1, 0, -1\}$ and during each phase the output voltage $V_{OUT}=n_{in}V_{in}+n_{11}V_1+n_{21}V_2+n_{22}V_2$. In the control matrix M1, passage from one row to the next corresponds to passage from one phase to the next. Read-out of all the rows of the matrix corresponds to execution of one whole cycle and read-out of the matrix restarts on the first row to initiate an identical new cycle.

It is envisionable to make the converter according to the invention operate with a succession of cycles comprising the same phases such as described above but in a different order from one cycle to the next.

FIG. 3b illustrates the switching cells used to make the connections corresponding to each control vector of the matrix M1. The switching cell $CCE_{in}$ is associated with the source of the input voltage $V_{in}$, the switching cell $CCE_{11}$ is associated with the battery $B_{11}$, the switching cell $CCE_{21}$ is associated with the battery $B_{21}$, the switching cell $CCE_{22}$ is associated with the battery $B_{22}$. Contrary to the general architecture of the switching cell shown in FIG. 2b, in this example the switching cells are optimized to minimize the number of switches in the possible series-connection configurations corresponding to each row vector of the control matrix M1. To make the schematics easier to read, the phase in which each switch is activated during execution of the cycle described by the matrix M1 has been added beside it.

It will be recalled that, in the initial state, depending on the group of the battery, each battery $B_{ij}$ stores an amount of charge $Q_{ij,opt}$ corresponding to $V_1$ or $V_2$.

During phase $\phi_1$, the control vector $V_{\phi 1}=[1, 0, -1, 0]$ is read from the control matrix M1. The control means then generate control signals for all the switches of the switching matrix so as to achieve series connection 41 shown in the schematic. Thus, during the phase $\phi_1$, $V_{OUT}=V_{in}-V_2=4-3=1$ V with $V_{OUT}$ measured between the two output nodes $V_o^+$ and $V_o^-$. During the phase $\phi_1$, the input voltage source $V_{in}$ delivers the amount of charge $+q$ to the battery $B_{21}$. The cumulative variation in the amount of charge at the end of the first phase is then $\Delta Q_{B21}=+q$ for the battery $B_{21}$, $\Delta Q_{GEN}=-q$ for the input voltage source, and 0 for the other elementary components.

During phase $\phi_2$, the control vector $V_{\phi 2}=[1, 0, 0, -1]$ is read from the control matrix M1. The control means then generate control signals for all the switches of the switching matrix so as to achieve series connection 42 shown in the schematic. Thus, during the phase $\phi_2$, $V_{OUT}=V_{in}-V_2=4-3=1$ V with $V_{OUT}$ measured between the two output nodes $V_o^+$ and $V_o^-$. During the phase $\phi_2$, the input voltage source $V_{in}$ delivers the amount of charge $+q$ to the battery $B_{22}$. The cumulative variation in the amount of charge at the end of the second phase is then $\Delta Q_{B21}=+q$ for the battery $B_{21}$, $\Delta Q_{GEN}=-2q$ for the input voltage source, $\Delta Q_{B22}=+q$ for the battery $B_{22}$ and $\Delta Q_{B11}=0$ for the battery $B_{11}$.

During phase $\phi_3$, the control vector $V_{\phi 3}=[0, -1, 1, 0]$ is read from the control matrix M1. The control means then generate control signals for all the switches of the switching matrix so as to achieve series connection 43 shown in the schematic. Thus, during the phase $\phi_3$, $V_{OUT}=V_2-V_1=3-2=1$ V with $V_{OUT}$ measured between the two output nodes $V_o^+$ and $V_o^-$. During the phase $\phi_3$, the battery $B_{21}$ delivers the amount of charge $+q$ to the battery $B_{11}$. The cumulative variation in the amount of charge at the end of the third phase is then $\Delta Q_{B21}=0$ for the battery $B_{21}$, $\Delta Q_{GEN}=-2q$ for the input voltage source, $\Delta Q_{B22}=+q$ for the battery $B_{22}$ and $\Delta QB_{11}=+q$ for the battery $B_{11}$.

During phase $\phi_4$, the control vector $V_{\phi 4}=[-1, 1, 0, 0]$ is read from the control matrix M1. The control means then generate control signals for all the switches of the switching matrix so as to achieve series connection 43 shown in the schematic. Thus, during the phase $\phi_4$, $V_{OUT}=V_2+V_1-V_{in}=3+2-4=1$ V with $V_{OUT}$ measured between the two output nodes $V_o^+$ and $V_o^-$. During phase $\phi_4$, the battery $B_{22}$ delivers the amount of charge $+q$ to the battery $B_{11}$, which in turn delivers the amount of charge $+q$ to the source GEN of the input voltage $V_{in}$. The cumulative variation in the amount of charge at the end of the third phase is then 0 for the battery $B_{21}$, $-q$ for the input voltage source, 0 for the battery $B_{22}$ and 0 for the battery $B_{11}$.

Table 1 collates the cumulative variations in amounts of charge in the various elementary components during the execution of the cycle according to the control matrix M1.

| Phase | $t_0 = 0$ | $\phi_1$ | $\phi_2$ | $\phi_3$ | $\phi_4$ |
|---|---|---|---|---|---|
| GEN ($V_{in}$) | $Q_{in}$ | $Q_{in} - q$ | $Q_{in} - 2q$ | $Q_{in} - 2q$ | $Q_{in} - q$ |
| $B_{11}$ | $Q_{11, opt}$ | $Q_{11, opt}$ | $Q_{11, opt}$ | $Q_{11, opt} + q$ | $Q_{11, opt}$ |
| $B_{21}$ | $Q_{21, opt}$ | $Q_{21, opt} + q$ | $Q_{21, opt} + q$ | $Q_{21, opt}$ | $Q_{21, opt}$ |
| $B_{22}$ | $Q_{22, opt}$ | $Q_{22, opt}$ | $Q_{22, opt} + q$ | $Q_{22, opt} + q$ | $Q_{22, opt}$ |
| $V_{out}$ | n.a | $4 - 3 = 1$ V | $4 - 3 = 1$ V | $3 - 2 = 1$ V | $3 + 2 - 4 = 1$ V |
| $Q_{out}$ on $V_{out}$ | 0 | q | 2q | 3q | 4q |

It may be seen from table 1 that the sum of the voltages of the elementary components connected in series is equal to the value of the predefined output voltage. The amount of charge in each energy-storing element at the start of a cycle is equal to the amount of charge at the end of the cycle. This allows the system to be stabilized with a view to minimizing variations in the voltage across the terminals of the battery so as to keep the "DC" bias voltage across the terminals of the battery constant over the course of the cycles and therefore to maximize the energy efficiency of the converter. It is envisionable with the cycle according to invention to limit the amplitude variations $\Delta V_{BAT}$ to below 10 mV with cycle frequencies comprised between 1 Hz and 10 kHz.

In addition, as the example M1 of a control matrix shows, the output nodes are always connected, in each phase, to at least one active battery being charged with or discharged by a charge q. Moreover, it may be seen that, during a cycle, the output node $V_{out}$ receives an amount of charge equal to $Q_{out}=+4q$ and the source GEN of the input voltage $V_{in}$ delivers an amount of charge +q. Thus, the energy input into the converter is equal to $E_{in}=4 \times V_{in} \times q$, and the energy output from the converter is equal to $E_{out}=4 \times V_{out} \times 4 \times q = 4 \times V_{in} \times q = E_{in}$. Thus, the energy efficiency of the converter is equal to 1.

Figure 4:
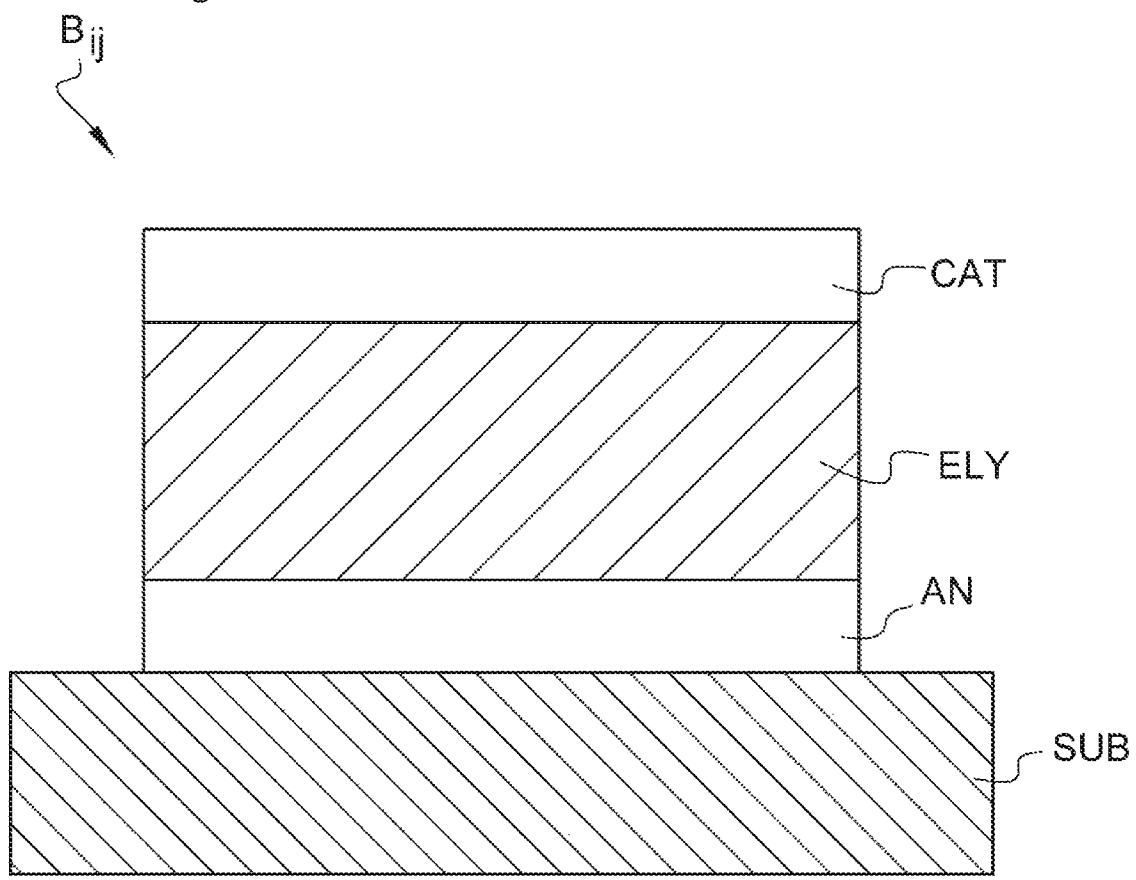
FIG. 4 illustrates one example of a solid-state battery compatible with incorporation of the converter according to the invention into an integrated circuit.

FIG. 4 illustrates one example of a solid-state battery compatible with incorporation of the converter according to the invention into an integrated circuit.

Solid-state batteries (or microbatteries) are a new battery technology in development. This technology is compatible with a microelectronic fabrication process. This type of microbattery has physical, density, thickness and unit-size characteristics allowing a compromise to be obtained between miniaturization and energy efficiency.

Without loss of generality, a solid-state battery may consist of a stack of thin layers placed on a substrate SUB, which will generally be made of a semiconductor. The stack of thin layers comprises a positive electrode CAT made of a conductive material, a negative electrode AN made of a conductive material, and an inorganic solid-electrolyte layer ELY placed between the positive electrode and the negative electrode.

Such a structure is producible with a succession of technological manufacturing steps that are well-established in the semiconductor industry, such as chemical etching, plasma etching, sputtering and lithography.

With this type of technology, it is possible to produce batteries that have an area comprised between 100 µm² and 5 mm², for an areal energy density ranging from 1 mAh/cm² to 10 mAh/cm². By way of indication, at equal area, the equivalent of a battery having an energy density of 1 mAh/cm² is a capacitor having a capacitance per unit area of 9 mF/mm². Currently, the best capacitances per unit area obtained with silicon-integratable capacitors are of the order of 1 µF/mm². The use of solid-state batteries in the silicon-integrated converter thus allows the energy density of the storing elements to be multiplied by a factor of 9000 compared to the use of capacitors of equal area (and/or equal volume).

FIG. 5 illustrates a plurality of examples of converter command matrices according to the invention achievable with microbatteries integratable into integrated circuits. It will be noted that the number of phases may be high (>10) and that the number of batteries connected in series in each phase may also be high (>10). To simplify the implementation of the circuit and to improve energy efficiency, it is preferable to decrease the number of batteries and their series connection. In this figure, the matrix notation [$n_{in}$, $n_1$, $n_2$] corresponds to each series of batteries, the individual connection of each battery not being indicated for the sake of simplicity. The number of columns corresponds to the number of groups of batteries and not to the number of batteries. For each control vector, one coefficient corresponds to the number of batteries of the associated group connected in series in the chosen configuration.

The converter commanded by the control matrix M2 is produced with two groups of batteries under respective biases of $V_1=2.5$ V, $V_2=3$ V in order to generate an output voltage $V_{OUT}=1$ V from an input voltage of $V_{IN}=4$ V. It is thus a question of a DC voltage converter with a voltage-conversion ratio of ¼. Two groups of batteries are used: a first group $G_1(V_1)=\{B_{11}, B_{12}\}$ composed of two batteries $B_{11}$, $B_{12}$ under an optimal bias voltage $V_1=2$ V and a second group $G_2(V_2)=\{B_{21}, B_{22}\}$ composed of two batteries $B_{21}$, $B_{22}$, each under an optimal bias voltage of $V_2=3$ V. The cycle of this example is composed of a sequence of 4 phases $\phi_1$, $\phi_2$, $\phi_3$ and $\phi_4$. The sequence of the various phases is arranged so as to respect the four characteristics detailed above of the cycle according to the invention.

The converter commanded via the control matrix M3 is produced with two groups of batteries under respective biases of $V_1=3$ V, $V_2=3.5$ V in order to generate an output voltage $V_{OUT}=1$ V from an input voltage of $V_{IN}=4$ V. It is thus a question of a DC voltage converter with a voltage-conversion ratio of ¼. Two groups of batteries are used: a first group $G_1(V_1)=\{B_{11}, B_{12}, B_{13}, B_{14}\}$ composed of four batteries $B_{11}$, $B_{21}$, $B_{13}$ and $B_{14}$ under an optimal bias voltage $V_1=2$ V and a second group $G_2(V_2)=\{B_{21}, B_{22}\}$ composed of two batteries $B_{21}$, $B_{22}$, each under an optimal bias voltage of $V_2=3$ V. The cycle of this example is composed of a sequence of 4 phases $\phi_1$, $\phi_2$, $\phi_3$ and $\phi_4$. The sequence of the various phases is arranged so as to respect the four characteristics detailed above of the cycle according to the invention.

The converter commanded via the control matrix M4 is produced with two groups of batteries under respective biases of $V_1=3$ V, $V_2=3.25$ V in order to generate an output voltage $V_{OUT}=1$ V from an input voltage of $V_{IN}=4$ V. It is thus a question of a DC voltage converter with a voltage-conversion ratio of ¼. Two groups of batteries are used: a first group $G_1(V_1)=\{B_{11}, B_{12}, B_{13}, B_{14}, B_{15}, B_{16}\}$ composed of four batteries $B_{11}$, $B_{21}$, $B_{13}$, $B_{14}$, $B_{15}$ and $B_{16}$ under an optimal bias voltage $V_1=2$ V and a second group $G_2(V_2)=\{B_{21}, B_{22}, B_{23}, B_{24}\}$ composed of four batteries $B_{21}$, $B_{22}$, $B_{23}$, $B_{24}$, each under an optimal bias voltage of $V_2=3$ V. The cycle of this example is composed of a sequence of 4 phases $\phi_1$, $\phi_2$, $\phi_3$ and $\phi_4$. The sequence of the various phases is arranged so as to respect the four characteristics detailed above of the cycle according to the invention.

It is possible to implement other combinations depending on the optimal bias voltages of the microbattery used. We have described examples with two groups of batteries but it is possible to produce the converter according to the invention with a plurality of groups of batteries. More generally, it is possible to decrease the number of phases, by using sufficiently different bias voltages Vi for each group of batteries. This makes it possible to obtain shorter cycles and therefore to increase conversion-cycle frequency.

Figure 6:
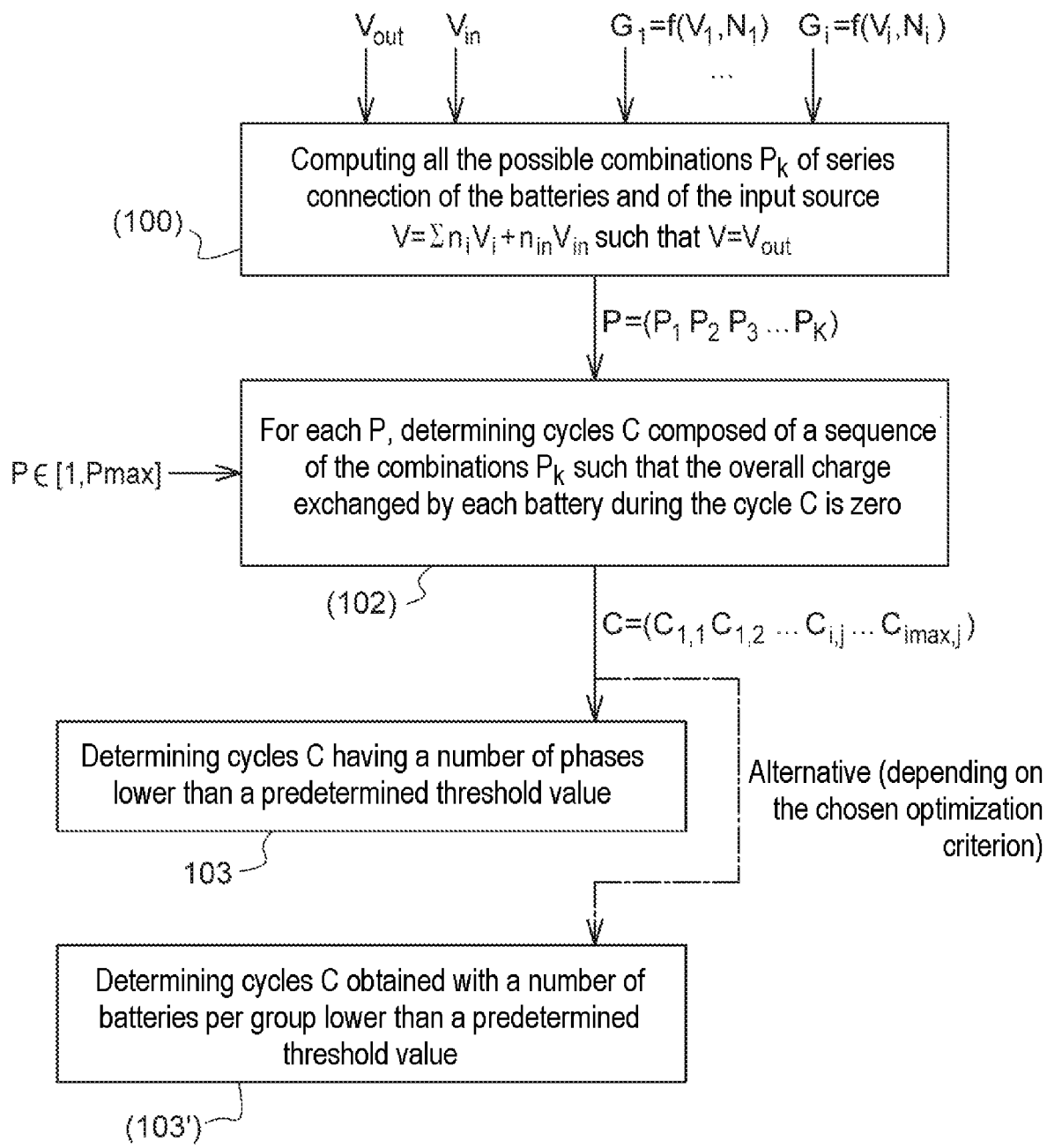
FIG. 6 illustrates a method allowing combinations of implementation according to the invention to be obtained for a given input voltage $V_{in}$, a given output voltage $V_{out}$, and a plurality of groups of batteries.

FIG. 6 illustrates a method allowing combinations of implementation according to the invention to be obtained for a given input voltage $V_{in}$, a given output voltage $V_{out}$, and a plurality of groups $G_1(V_1, N_1)$ to $G_i(V_i, N_i)$ of batteries defined by the number $N_i$ of batteries and the bias voltage $V_i$. The bias voltages $V_i$ are chosen so as to place the operating point in the voltage plateau indicated in FIG. 1b.

The first step 101 consists in determining and computing all the possible combinations $P_k$ of series connection of the batteries and of the input source $V=\Sigma n_i V_i + n_{in} V_{in}$ such that $V=V_{out}$. This ensures that the target output-voltage value is obtained as output of the combinations $P_k$ of series connections. Thus, in each phase, the circuit is connected according to one combination $P_k$ allowing the main conversion function to be performed.

The second step 102 is carried out for each integer number of phases p chosen between 1 and $p_{max}$. The second step 102 consists in determining cycles C composed of a sequence of the combinations $P_k$ obtained in step 101 so that the overall charge exchanged by each battery during the cycle C is zero. This ensures that the "closed cycle" criterion is respected by the cycles retained at the end of step 102.

The last step 103 or 103' is a step of optimizing depending on a predetermined optimization criterion depending on the specifications of the system. If the chosen criterion is minimization of the number of phases $P_k$ in a cycle C, step 103 is executed by determining cycles C having a number of phases lower than a predetermined threshold value. The advantage of this optimization is the decrease in the number of times the energy-storing elements are switched thus minimizing energy losses due to switching. If the chosen optimization criterion is minimization of the number of batteries per group, step 103' is executed such as to determine the cycles C obtained in the preceding steps for number of batteries lower than a predetermined threshold value. The advantage of this optimization is the decrease in the area occupied by the converting device, allowing the integratability of the device into semiconductor circuits to be improved.

The invention claimed is:

1. A device for converting an input DC voltage (Vin) into an output DC voltage (Vout) having a predetermined value, comprising: a set of elementary components comprising: a voltage source (Gin) for generating the input DC voltage (Vin); two output nodes (Vout+, Vout−); a plurality of energy-storing elements (Bij), each consisting of one battery or of a plurality of batteries connected in series or in parallel; a switching matrix (MC), configured to connect the elementary components to one another in a periodic cycle composed of a plurality of phases; each phase being associated with one different connection configuration chosen so that: in each energy-storage element, the amount of charge at the start of the cycle is equal to the amount of charge at the end of the cycle; the two output nodes (Vout+, Vout−) have a potential difference equal to the predetermined value of the output DC voltage (Vout) during all the phases, wherein: the switching matrix (MC) comprises a plurality of elementary switching cells (CEEij), each elementary switching cell (CEEij) being associated with one elementary component and comprising at least two commanded switches; each elementary component has two terminals, and for each elementary component: the first terminal is connected, via at least a first commanded switch, to any at least one terminal chosen from the terminals of the other elementary components or either one of the output nodes (Vout+, Vout−); the second terminal is connected, via at least a second commanded switch, to any at least one terminal chosen from the terminals of the other elementary components or either one of the output nodes (Vout+, Vout−).

2. The device for converting an input DC voltage ($V_{in}$) into an output DC voltage ($V_{out}$) according to claim 1, wherein the voltage across the terminals of each energy-storing element is kept in a predetermined voltage range corresponding to a voltage plateau during the variation in the amount of charge in the energy-storing element.

3. The device for converting an input DC voltage ($V_{in}$) into an output DC voltage ($V_{out}$) according to claim 1, wherein the duration of each phase is defined so that the relative variation in the amount of charge in the energy-storing element from one phase to the next is lower than a predetermined value.

4. The device for converting an input DC voltage ($V_{in}$) into an output DC voltage ($V_{out}$) according to claim 1, wherein the output nodes ($V_{out+}$, $V_{out-}$) are always connected to at least one energy-storing element ($B_{1,1}$) in each phase.

5. The device for converting an input DC voltage ($V_{in}$) into an output DC voltage ($V_{out}$) according to claim 1, wherein the switching matrix (MC) is configured so that, for each cycle:
for each chosen configuration, a number of elementary components are connected in series with one another; and the output voltage ($V_{out}$) is equal to the sum of the voltages across the terminals of the series-connected elementary components.

6. The device for converting an input DC voltage (Vin) into an output DC voltage (Vout) according to claim 1, wherein the commanded switches are produced with CMOS transistors.

7. The device for converting an input DC voltage ($V_{in}$) into an output DC voltage ($V_{out}$) according to claim 1, wherein the batteries are solid-state batteries.

8. The device for converting an input DC voltage ($V_{in}$) into an output DC voltage ($V_{out}$) according to claim 7, wherein the solid-state batteries are produced by stacking layers and comprise:
a positive electrode;
a negative electrode;
an inorganic solid electrolyte layer placed between the positive electrode and the negative electrode.

9. The device for converting an input DC voltage ($V_{in}$) into an output DC voltage ($V_{out}$) according to claim 8, wherein the solid-state batteries are lithium-ion microbatteries.

10. The device for converting an input DC voltage ($V_{in}$) into an output DC voltage ($V_{out}$) according to claim 1, wherein the variation in the voltage across the terminals of each energy-storing element is smaller than 10 mV.

11. The device for converting an input DC voltage ($V_{in}$) into an output DC voltage ($V_{out}$) according to claim 1, wherein the cycles have a frequency comprised between 1 Hz and 10 kHz.

12. The device for converting an input DC voltage ($V_{in}$) into an output DC voltage ($V_{out}$) according to claim 1, further comprising a circuit for controlling bias configured to reset the voltage across the terminals of each energy-storing element to a value corresponding to an optimum energy density after a predetermined number of cycles.

\* \* \* \* \*